United States Patent
Seto et al.

(10) Patent No.: US 7,930,894 B2
(45) Date of Patent: Apr. 26, 2011

(54) COOLING DEVICE, PROJECTOR, AND COOLING METHOD

(75) Inventors: Takeshi Seto, Chofu (JP); Takashi Toyooka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1147 days.

(21) Appl. No.: 11/539,432

(22) Filed: Oct. 6, 2006

(65) Prior Publication Data
US 2007/0079959 A1    Apr. 12, 2007

(30) Foreign Application Priority Data
Oct. 7, 2005   (JP) .................................. 2005-294515

(51) Int. Cl.
G05D 11/16    (2006.01)
F25D 23/12    (2006.01)
(52) U.S. Cl. .......................................... 62/158; 62/259.2
(58) Field of Classification Search .................... 62/158, 62/259.2, 185, 201
See application file for complete search history.

(56) References Cited

U.S. PATENT DOCUMENTS

| | | | | |
|---|---|---|---|---|
| 1,565,590 A * | 12/1925 | Ritterrath | ............................ | 353/54 |
| 2,837,965 A * | 6/1958 | Goldsmith | ........................... | 353/54 |
| 5,504,924 A * | 4/1996 | Ohashi et al. | ................... | 361/676 |
| 5,752,758 A * | 5/1998 | Woo | ................................... | 353/69 |
| 6,639,797 B2 * | 10/2003 | Saeki et al. | ..................... | 361/698 |
| 6,909,419 B2 * | 6/2005 | Zavracky et al. | ............... | 345/102 |
| 6,966,652 B1 * | 11/2005 | Lai et al. | ........................... | 353/52 |
| 6,967,758 B2 * | 11/2005 | Amm et al. | ...................... | 359/237 |
| 7,036,939 B2 * | 5/2006 | Cole et al. | ........................ | 353/52 |
| 7,086,739 B2 | 8/2006 | Kida et al. | | |
| 7,571,617 B2 * | 8/2009 | Inoue et al. | ...................... | 62/157 |
| 7,571,618 B2 * | 8/2009 | Dessiatoun | ................... | 62/259.2 |
| 7,617,696 B2 * | 11/2009 | Manole | ......................... | 62/259.2 |
| 2002/0001176 A1 * | 1/2002 | Shibasaki | ...................... | 361/687 |
| 2002/0089590 A1 * | 7/2002 | Kondo et al. | .................. | 348/207 |
| 2004/0218150 A1 * | 11/2004 | Schaareman et al. | ........... | 353/52 |
| 2005/0040924 A1 * | 2/2005 | LaBoube et al. | .................. | 336/5 |
| 2005/0046801 A1 * | 3/2005 | Yamada | .......................... | 353/54 |
| 2005/0151717 A1 * | 7/2005 | Seo | ................................ | 345/102 |
| 2007/0176886 A1 * | 8/2007 | Nagasawa | ..................... | 345/102 |

FOREIGN PATENT DOCUMENTS

| | | |
|---|---|---|
| CN | 1550868 A | 12/2004 |
| JP | 11-337897 | 12/1999 |
| JP | 2000-035613 | 2/2000 |
| JP | A 2003-005146 | 1/2003 |
| JP | A 2004-287190 | 10/2004 |
| JP | 2004-362820 | 12/2004 |
| JP | 2005-070514 | 3/2005 |
| JP | 2005-121890 | 5/2005 |
| KR | A 10-1999-0031609 | 5/1999 |
| KR | A 10-2005-0015394 | 2/2005 |

* cited by examiner

Primary Examiner — Judy Swann
Assistant Examiner — Alexis K Cox
(74) Attorney, Agent, or Firm — Oliff & Berridge, PLC

(57) ABSTRACT

A cooling device that cools a heat generator generating heat in response to application or a signal based on a predetermined signal via a cooling fluid includes a cooling fluid cooling section that cools the cooling fluid, a control section that controls the cooling fluid cooling section in accordance with a signal based on the predetermined signal, and a signal processing section that supplies the heat generator with the signal based on the predetermined signal relatively late, and supplies the control section with the signal based on the predetermined signal relatively early.

17 Claims, 6 Drawing Sheets

COOLING DEVICE, PROJECTOR, AND COOLING METHOD

CROSS-REFERENCE TO RELATED APPLICATION

This application claims priority from Japanese Patent Application No. 2005-294515, filed in the Japanese latent Office on Oct. 7, 2005, the entire disclosure of which is hereby incorporated by reference in its entirety.

BACKGROUND

1. Technical Field

The present invention relates to a cooling device, a projector, and a cooling method.

2. Related Art

In recent years, small-sized cooling devices for cooling heat generating devices or the like to prevent equipment provided with such devices from being heated to high temperatures thereby ensuring preferable operations of the equipment have been used or planed to be used in various applications.

For example, there is proposed a projector provided with a solid-state light source having high response to a signal supplied thereto and superior light controllability. Although such a solid-state light source, which is a heat generator, increases in a light emission amount in proportion to a current supply amount, the amount of heat generated also increases similarly. Therefore, if a large amount of current is supplied, the solid state light source is damaged, or the life of the light source is shortened, by the heat the solid state light source generates. Accordingly, it has been proposed to prevent the damage of the solid-state light source and to prolong the life of the solid-state light source by cooling the solid-state light source with the cooling device described above.

Incidentally, such a cooling device is specifically provided with a cooling fluid for cooling the heat source such as the solid-state light source and cooling fluid cooling means for cooling the cooling fluid heated to a high temperature by absorbing the heat generated by the heat source. And, in such a cooling device, in order to achieve quietness and low power consumption of the device, it is preferable that the cooling fluid cooling means is driven corresponding to the heat generation amount of the heat generator.

For example, JP-A-2005-70514 (hereinafter referred to as a first document) and JP-A-2000-35613 (hereinafter referred to as a second document) disclose a technology of disposing a thermometer adjacent to the heat source (light source) and changing the driving state of the cooling fluid cooling means in accordance with the output of the thermometer. According to this technology, since it can be arranged that the cooling fluid cooling means only cools the cooling fluid aggressively when the heat generating amount of the heat source increases, driving the cooling fluid cooling means unnecessarily can be eliminated. Besides the above, there is a related device disclosed in JP-A-11-337897.

However, there is inevitably caused a time lag between cooling of the cooling fluid by the cooling fluid cooling means and absorption of the heat of the heat source by the cooling fluid thus cooled. In particular, the time lag described above becomes large in the cooling device using liquid as the cooling fluid, such as the cooling device for cooling a solid-state light source provided to a projector.

Therefore, according to the technology disclosed in the first and the second documents, the temperature of the heat generator temporarily increases. Accordingly, in the cooling device in the related art, in consideration of the temporary temperature rise of the heat generator, it was necessary to design the device so that the temperature thereof did not reach, for example, the damaging temperature even when the temperature of the heat generator temporarily rose. Therefore, the advantage obtained by cooling the heat source with the cooling device was problematically reduced.

SUMMARY

An advantage of some aspects of the invention is to prevent the temporary temperature rise of the heat generator in driving the cooling fluid cooling section in accordance with the heat generation amount of the heat generator.

A cooling device according to an aspect of the invention is a cooling device that cools a heat generator generating heat in response to application of a signal based on a predetermined signal via a cooling fluid (cooling medium) including a cooling fluid cooling section that cools the cooling fluid, a control section that controls the cooling fluid cooling section in accordance with a signal based on the predetermined signal, and a signal processing section that supplies the heat generator with the signal based on the predetermined signal relatively late, and supplies the control section with the signal based on the predetermined signal relatively early.

According to the cooling device of the aspect of the invention having the above features, the signal processing section supplies the signal based on the predetermined signal to the heat generator relatively late, and supplies the signal based on the predetermined signal to the control section that controls the cooling fluid cooling section early, in accordance with the signal supplied to the heat generator based on the predetermined signal.

Therefore, the control section can know the heat value to be generated by the heat generator in the future in response to application of the signal based on the predetermined signal, and drive the cooling fluid cooling section accordingly to the future heat value of the heat generator. In other words, it becomes possible to set the temperature of the cooling fluid to a temperature corresponding to the case in which the heat value of heat generator increases prior to the heat value of the heat generator increasing.

Therefore, according to the cooling device of the aspect of the invention, it becomes possible to prevent the temporary temperature rise of the heat generator in the case in which the cooling fluid cooling section is driven in accordance with the value of the heat generated by the heat generator.

Further, in the cooling device according to another aspect of the invention, the configuration can be adopted in which a plurality of heat generators are provided, and at least the cooling fluid, a cooling fluid cooling section, and a control section are provided for every heat generator.

By adopting such a configuration, it becomes possible to cool each of the heat generators in accordance with the heat value of the respective heat generator even if the heat values of the heat generators are different form each other.

Further, in the cooling device according to another aspect of the invention a specific signal detecting section that detects a specific signal different from the signal based on the predetermined signal is provided, and the signal processing section outputs the predetermined signal in real time in response to the specific signal detecting section detecting the specific signal.

According to this aspect of the invention, since the signal to be supplied to the heat generator and based on the predetermined signal is relatively delayed by the signal processing section, the timing when the heat generator is supplied with the signal based on the predetermined signal is delayed compared to the case in which the cooling device is not applied. Therefore, by adopting such a configuration as described above, it becomes possible to supply the heat generator with the signal based on the predetermined signal in real time in, for example, a predetermined situation.

Further, in the cooling device according to another aspect the invention, a configuration in which the cooling fluid is liquid can specifically be adopted.

Further, a configuration in which the cooling fluid cooling section is a cooling fan can specifically be adopted.

Another aspect of the invention is a projector which includes a light source which is a heat generator, and the cooling device according to the above aspect of the invention.

According to the cooling device of the aspect of the invention, it becomes possible to prevent the temporary temperature rise of the heat generator in the case in which the cooling fluid cooling section is driven in accordance with the value of the heat generated by the heat generator. Therefore, according to the projector of this aspect of the invention, it becomes possible to, for example, drive the light source with larger current and to improve the display characteristics.

Further, in the projector according to another aspect of the invention, a configuration can be adopted in which the light control process is preformed using the signal supplied to the control section and based on the predetermined signal.

By adopting such a configuration, it becomes unnecessary to newly generate the signal for light control process even for the projector performing the light control process.

And, a cooling method according to another aspect of the invention is a cooling method of cooling a heat generating body generating heat in response to application of a signal based on a predetermined signal via a cooling fluid including: supplying a signal based on the predetermined signal to a control section that controls a cooling fluid cooling section relatively early, and supplying the signal based on the predetermined signal to the heat generating body relatively late.

According to the cooing method of the aspect of the invention having an above feature, the heat generator is supplied relatively late with the signal based on the predetermined signal, and the control section that controls the cooling fluid cooling section in accordance with the signal (the signal supplied to the heat generator) based on the predetermined signal is supplied relatively early with the signal based on the predetermined signal.

Therefore, the control section can know the heat value to be generated by the heat generator in the future in response to application of the signal based on the predetermined signal, and drive the cooling fluid cooling section according to the future heat value of the heat generator. In other words, it becomes possible to set the temperature of the cooling fluid to a temperature corresponding to the case in which the heat value of heat generator increases prior to the increase in the heat value of the heat generator.

Therefore, according to the cooling method of the aspect of the invention, it becomes possible to prevent the temporary temperature rise of the heat generator in the case in which the cooling fluid cooling section is driven in accordance with the value of the heat generated by the heat generator.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

Figure 1:
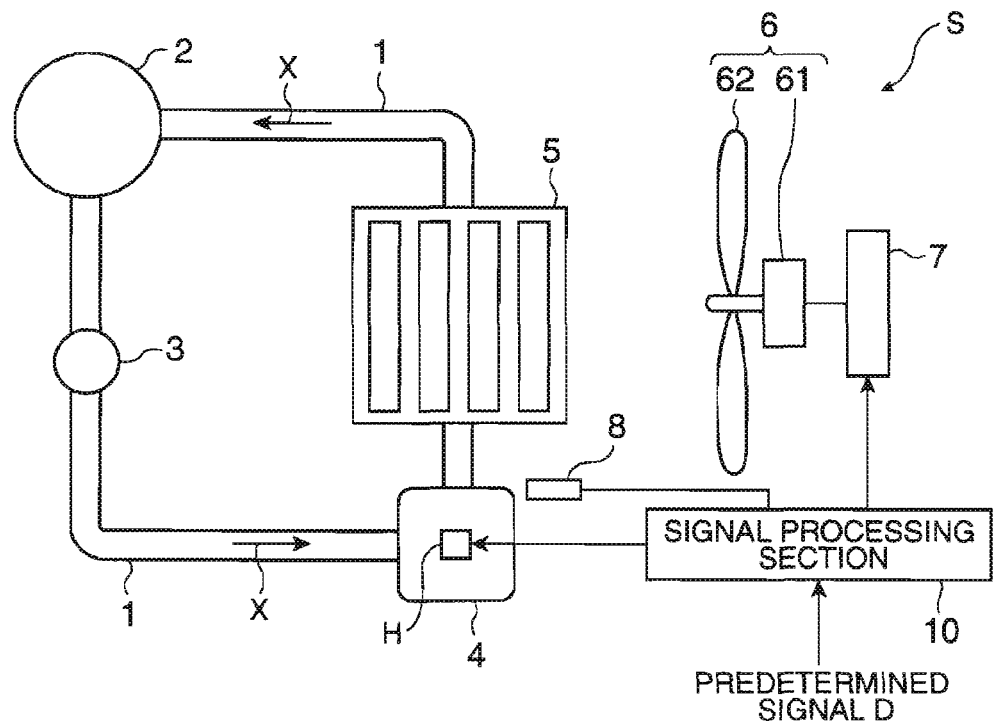
FIG. 1 is a schematic diagram showing the rough configuration of a cooling device as one embodiment of the invention.

Hereinafter, an embodiment of a cooling device, a projector, and a cooling method according to the invention will be explained with reference to the drawings. It should be noted that the scale size of each member is accordingly altered so that the member is shown large enough to be recognized in the drawings below.

Figure 2:
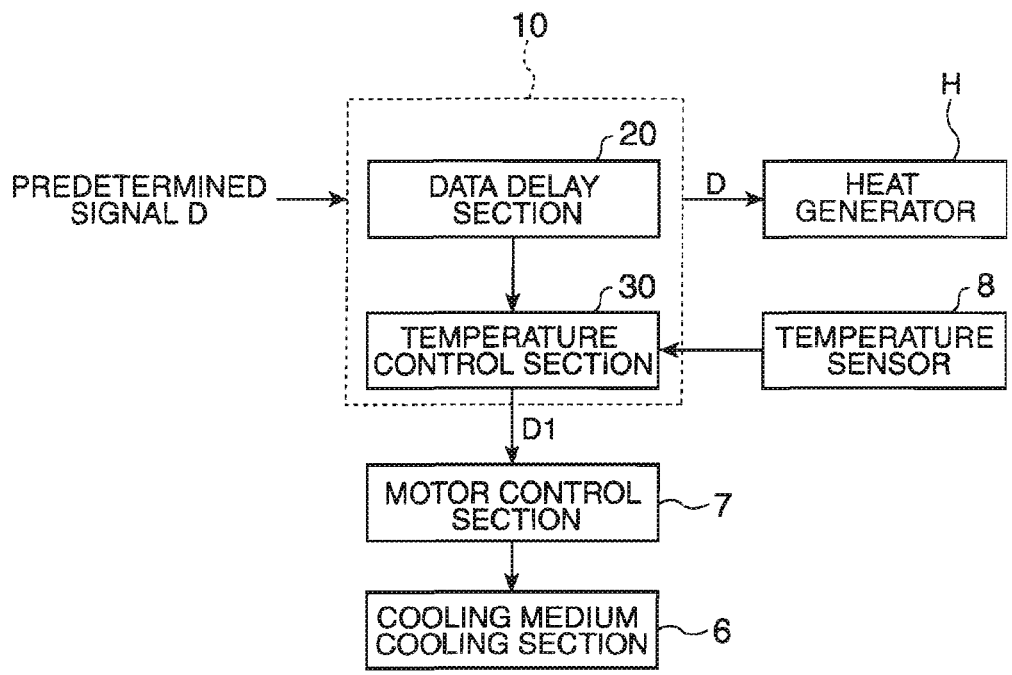
FIG. 2 is a block diagram showing a functional configuration of a control system of the cooling device as one embodiment of the invention.

FIG. 1 is a schematic diagram showing a rough configuration of the cooling device S of the present embodiment. Further, FIG. 2 is a block diagram showing a functional configuration of a control system S of the cooling device of the present embodiment.

The cooling device S of the present embodiment is for cooling a heat generator H via a cooling fluid (cooling medium) X, and as shown in FIG. 1, is configured including tubes 1, a reservoir 2, a pump 3, a heat receiving section 4, a heat radiating section 5, a cooling fluid cooling section 6, a motor control section 7 (control means), a temperature sensor 8, and a signal processing section 10 (signal processing means). It should be noted that a liquid is used as the cooling fluid X of the present embodiment.

The tubes 1 are for forming a circulating flow channel of the cooling fluid X, and are formed like a circular shape. And, in nodes of the tubes 1, there are disposed the reservoir 2, the pump 3, the heat receiving section 4, and the heat radiating section 5.

The reservoir 2 is for temporarily reserving the cooling fluid X, and is provided with a predetermined capacity of space inside thereof. The pump 3 is for causing flow of the cooling fluid X in the tubes 1.

The heat receiving section 4 is arranged to be in contact with the heat generator, and is made of a material having a high heat transfer coefficient, such as metal. And, the heat of the heat generator H is absorbed by the cooling fluid X in the heat receiving section 4, thereby cooling the heat generator H.

The heat radiating section 5 is for radiating the heat of the cooling fluid X thus heated to a high temperature by absorbing the heat of the heat generator H, and is configured as a radiator in the present embodiment.

The cooling fluid cooling section 6 is for cooling the cooling fluid X, and is configured with a cooling fan provided with a fan 62 and a fan-drive motor 61 in the present embodiment.

The fan-drive motor 61 is a motor for driving the fan 62. The fan-drive motor 61 rotationally drives the fan 62 to cause wind, thus the heat of the cooling fluid X is radiated via the heat radiating section 5, thereby cooling the cooling fluid X.

The motor control section 7 is for controlling the cooling fluid cooling section 6 in accordance with a signal D1, which is a signal supplied to the heat generator H, based on a predetermined signal and specifically controls the fan-drive motor 61 to control the rotational frequency of the fan 62.

The temperature sensor 8 is disposed adjacent to the heat generator H so as to be able to measure the temperature of the heat generator H, and is connected to the signal processing section 10.

The signal processing section 10 is for supplying the heat generator H with a signal based on a predetermined signal D relatively late, and for supplying the motor control section 7 with the signal based on the predetermined signal D relatively early.

Specifically, the signal processing section 10 is configured including a data delay section 20 and a temperature control section 30 as shown in FIG. 2.

And, the data delay section 20 delays, for a predetermined period of time, a signal (the predetermined signal D itself in the present embodiment) based only the predetermined signal D supplied from the outside and supplies the heat generator H with the signal thus delayed, and at the same time, supplies the temperature control section 30 with the predetermined signal D supplied from the outside in real time. Further, the temperature control section 30 calculates the value of heat (the heat value of the heat generator H in accordance with the predetermined signal D supplied thereto) to be generated in the future by the heat generator 1-H based on both the predetermined signal D supplied from the data delay section 20 and the measurement signal supplied from the temperature sensor 8 described above, and then supplies the motor control section 7 with the calculation result as the signal D1 based on the predetermined signal D.

As a result, the heat generator 14 is supplied with the predetermined signal D with delay, and the motor control section 7 is supplied with the signal D1 based on the predetermined signal D in real time. Namely, the signal processing section 10 supplies the heat generator H with the signal (the predetermined signal D itself in the present embodiment) based on the predetermined signal D relatively late, and supplies the motor control section 7 with the signal D1 based on the predetermined signal D relatively early.

The operation (the cooling method) of the cooling device of the present embodiment configured as described above will now be explained.

Firstly, it is premised that in the cooling device S of the present embodiment, the pump is driven constantly, and the cooling fluid X is circulated in the tubes 1 at a constant flow rate.

And, the cooling fluid X absorbs the heat from the heat generator 111 in the heat receiving section 4 in the process of circulating in the tubes 1, and is cooled in the heat radiating section 5 by radiating the heat absorbed from the heat generator H, and then further circulates to absorb the heat from the heat generator H in the heat receiving section 4.

In such continuous flow, when the predetermined signal D is input to the signal processing section 10 from the outside, the signal processing section 10 supplies the heat generator with the predetermined signal D with delay, and supplies the motor control section 7 with the signal D1 based on the predetermined signal D in real time. Namely, the signal processing section 10 supplies the heat generator 11 with the signal (the predetermined signal D itself in the present embodiment) based on the predetermined signal D relatively late, and supplies the motor control section 7 with the signal D1 based on the predetermined signal D relatively early.

Specifically, the predetermined signal D input to the signal processing section 10 is supplied to the heat generator H with a predetermined delay, and to the temperature control section 30 of the signal processing section 10 in real time by the data delay section 20 of the signal processing section 10. Further, the present temperature status of the heat generator H is input to the temperature control section 30 via the temperature sensor 8. And, the value of the heat (the heat value of the heat generator H in accordance with the predetermined signal D supplied thereto) to be generated in the future by the heat generator H is calculated from both the predetermined signal D supplied to the temperature control section 30 in real time and measured temperature of the heat generator H, and the motor control section 7 is supplied with the calculation result as the signal D1 based on the predetermined signal D.

As a result, it becomes possible to adjust the temperature of the cooling fluid X to a suitable temperature to the heat value of the heat generator H in the case in which the predetermined signal D is supplied to the heat generator H by the cooling fluid cooling section 6 prior to the temperature of the heat generator H varying in response to the predetermined signal D supplied to the heat generator H.

Figure 3:
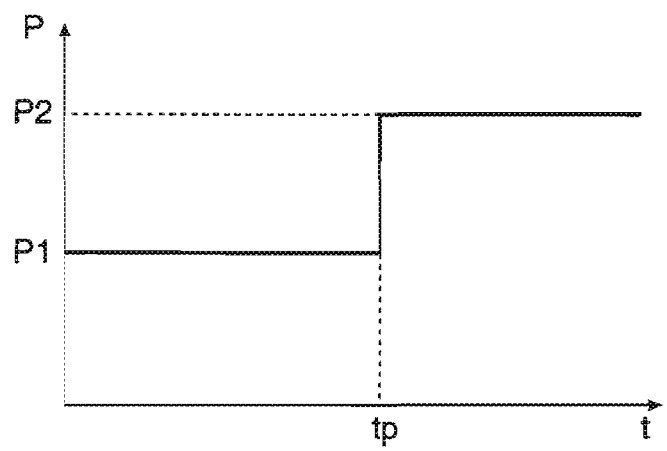
FIG. 3 is an explanatory chart for explaining the operation of the cooling device as one embodiment of the invention.
Figure 4:
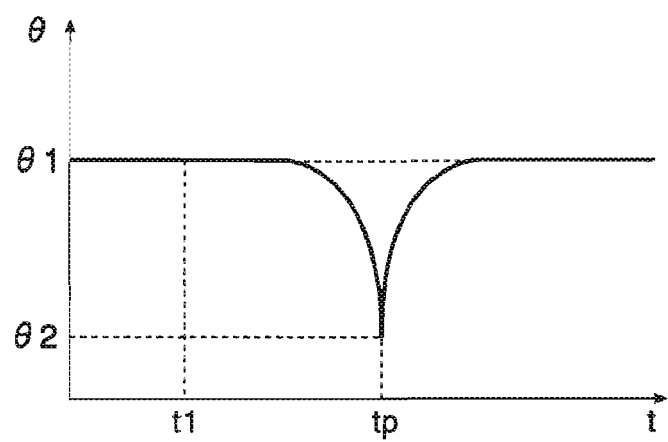
FIG. 4 is another explanatory chart for explaining the operation of the cooling device as one embodiment of the invention.

For example, (FIG. 9, steps S1-S3) in the case in which the heat value P of the heat generator H rises from P1 to P2 at a time point tp, as shown in FIG. 3, in response to application of the predetermined signal D, since the motor control section 7 is supplied with the signal D1 based on the predetermined signal D in advance, the cooling fluid cooling section 6 starts the driving operation according to the heat value P2 of the heat generator H at a time point t1 prior to the time point tp as shown in FIG. 4. Since there is a time lag between when the cooling fluid X is cooled by the cooling fluid cooling section 6 and when the cooling fluid X thus cooled reaches the heat receiving section 4, as a result, as shown in FIG. 4, the cooling fluid X thus cooled reaches the heat receiving section 4 right before the time point tp to reduce the temperature θ of the heat generator H from a temperature θ1 to a temperature θ2. In other words, the temperature of the cooling fluid X should be adjusted to a suitable temperature for the heat value of the heat generator H prior to the case in which the predetermined signal D is applied to the heat generator H. And, since the heat value of the heat generator increases at the time point tp, the temperature θ of the heat generator H rises again towards the temperature θ1 after the time point tp.

According to the cooling device S and the cooling method of the present embodiment as described above, the heat generator H is supplied with the signal (the predetermined signal D itself in the present embodiment) based on the predetermined signal relatively late, and the motor control section 7, which controls the cooling fluid cooling section 6 in accordance with the signal D1 based on the predetermined signal, is supplied with the signal D1 based on the predetermined signal relatively early.

Therefore, the motor control section 7 can know the heat value to be generated by the heat generator H in the future in response to application of the signal based on the predetermined signal, and drive the cooling fluid cooling section 6 according to the future heat value of the heat generator. In other words, it becomes possible to set the temperature of the cooling fluid X to a temperature corresponding to the case in which the heat value of heat generator H increases prior to the heat value of the heat generator H increasing.

Therefore, according to the cooling device S and the cooling method of the present embodiment, it becomes possible to prevent the temporary temperature rise in the heat generator H in the case in which the cooling fluid cooling section 6 is driven in accordance with the heat value of the heat generator H, thus the heat generator can more efficiently be cooled.

A projector provided with a light source as the heat generator H of the above embodiment and the cooling device S of the above embodiment as a cooling device for cooling the light source will now be explained.

Figure 5:
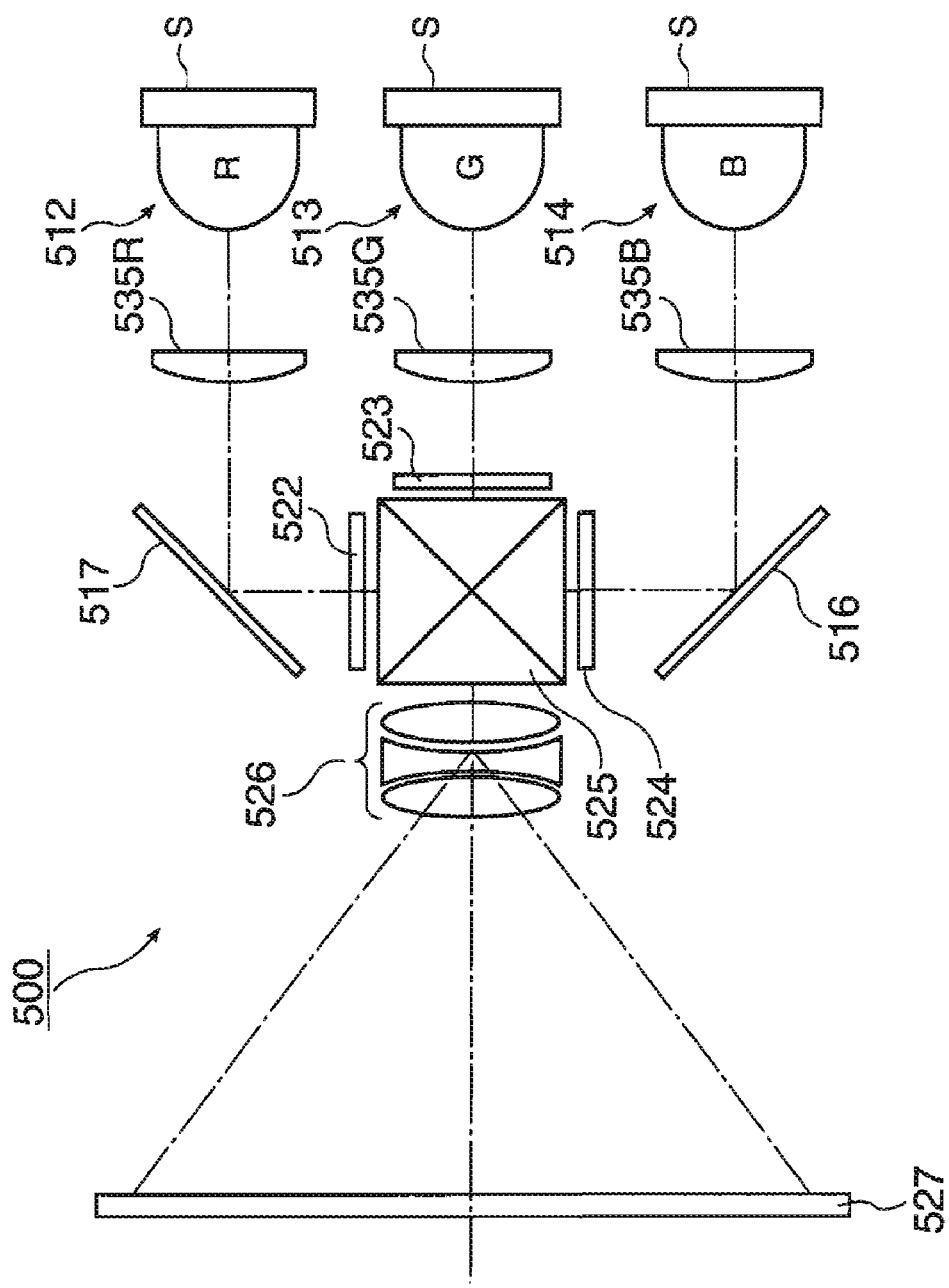
FIG. 5 is an explanatory diagram of a projector provided with the cooling device as one embodiment of the invention.

FIG. 5 is an explanatory diagram of the projector 500. In the drawing, the reference numerals 512, 513, and 514 each denote a light source, the reference numerals 522, 523, and 524 each denote a liquid crystal light valve, the reference numeral 525 denotes a cross dichroic prism, the reference numeral 526 denotes a projection lens, The projector 500 shown in FIG. 5 is provided with the three light sources 512, 513, and 514 each configured as the present embodiment. As the light sources 512, 513, and 514, LEDs (solid-state light sources) respectively emitting red (R), green (G), and blue (B) are adopted. It should be noted that a rod lens or a fly-eye lens could be disposed behind each of the light sources as an even lighting system for making the intensity distribution of light from the light source even.

The light beam from the red light source 512 is transmitted by an overlapping lens 535R, then reflected by a reflecting mirror 517, and enters the red light liquid crystal light valve 522. Further, the light beam from the green light source 513 is transmitted by an overlapping lens 535G, and enters the green light liquid crystal light valve 523.

Further, the light beam from the blue light source 5 14 is transmitted by an overlapping lens 535B, then reflected by a reflecting mirror 516, and enters the blue light liquid crystal light valve 524. It should be noted that the light beam from each of the light sources is overlapped in the display area of the liquid crystal light valve so that the liquid crystal light valve is lighted evenly.

Further, in the entrance side and the exit side of each of the liquid crystal light valves, there are respectively disposed polarization plates (not shown). And, only a linearly polarized beam with a predetermined polarizing direction out of each of the light beams from the light sources is transmitted through the entrance side polarization plate, and enters each respective liquid crystal light valves. Further, a polarization converter (not shown) can be provided in a position anterior to the entrance side polarization plate. In this case, it becomes possible to reuse the light beam reflected by the entrance side polarization plate to make the light beam enter the respective one of the liquid crystal light valves, and thus the light efficiency can be enhanced.

The three colored light beams modulated by the respective liquid crystal light valves 522, 523, and 5214 then enter the cross dichroic prism 525. The prism is formed by bonding four rectangular prisms, and is provided with a dielectric multilayer film for reflecting red light and a dielectric multilayer film for reflecting blue light disposed on the inside surfaces forming a crisscross. The three colored light beams are combined by these dielectric multilayer films to form a light beam for displaying a color image. And, the light beam obtained by combining the three colored light beams is projected on a projection screen 527 by a projection lens 526 to display an enlarged image.

And, in the projector 500 of the present embodiment, the cooling device S of the above embodiment is used for each of the light sources 512, 513, and 514.

As described above, by providing the cooling device S of the above embodiment capable of preventing the temporary temperature rise of the heat generator as the cooling device for cooling each of the light sources 512, 513, and 514, it becomes possible to, for example, drive the light sources 512, 513, and 514 with larger current, and thus the display characteristics can be improved.

Further, in the projector 500 of the present embodiment, the cooling device S of the above embodiment is used for each of the light sources 512, 513, and 514. Namely, a plurality of heat generators is provided, and the cooling device S is provided for every heat generator.

By adopting such a configuration, it becomes possible to cool the light sources 512, 513, and 514 in accordance with the respective heat values of the light sources 512, 513, and 514 even if the heat values of the light sources 512, 513, and 514 are different from each other.

A specific configuration example of the data delay section 20 of the signal processing section 10 in the case in which the projector 500 of the present embodiment is provided with the cooling devices S will now be explained with reference to FIGS. 6 through 8.

Figure 6:
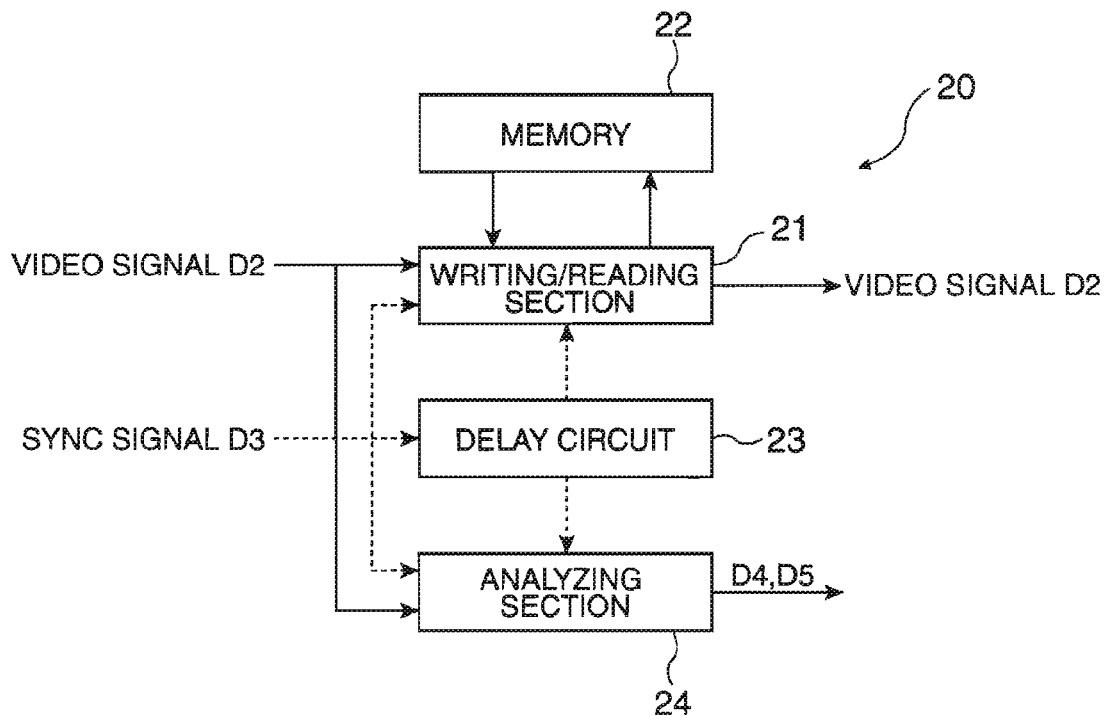
FIG. 6 is a block diagram showing a specific functional configuration of a data delay section.

FIG. 6 is a block diagram showing a specific functional configuration of the data delay section 20. As shown in the drawing, the data delay section 20 is configured including a writing/reading section 21, a memory 22, a delay circuit 23, and an analyzing section 24. And, it is assumed that, in the present embodiment, a video signal D2 and a sync signal D3 are input to the data delay section 20 of the signal processing section 10 as the predetermined signal D described above.

Figure 9:
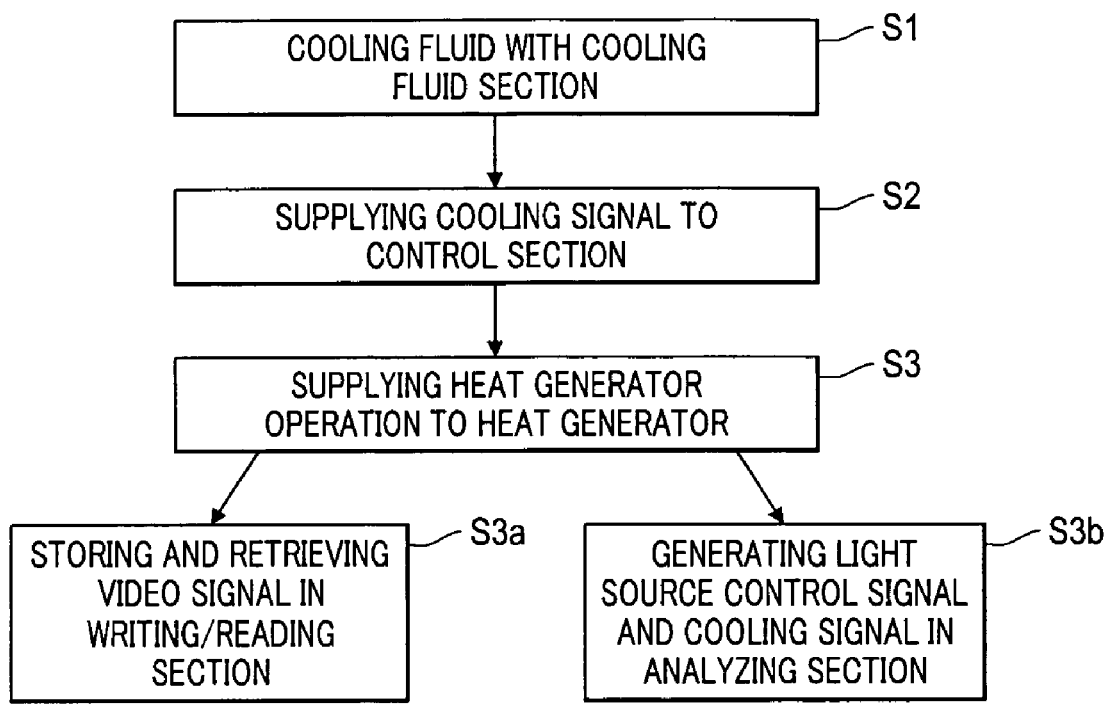
FIG. 9 is a flowchart of a method of cooling a heat generator via a cooling fluid.

The writing/reading section 21 is for temporarily storing the video signal D2 provided from the outside in the memory 22 and retrieving the video signal D2 temporarily stored in the memory 22 to output it. The writing/reading section 21 temporarily stores the video signal D2 in the memory 22 in accordance with the sync signal D3 provided form the outside, and retrieves the video signal D2 temporarily stored in the memory 22 in accordance with the sync signal D3 supplied from the delay circuit 23 to output it (FIG. 9, step S3a).

Further, the delay circuit 23 is for delaying the sync signal D3 supplied from the outside and outputting it. It should be noted that the delay time of the sync signal by the delay circuit 23 corresponds to the time difference between the output of a light source control signal D4 and the output of a cooling control signal D5 described later.

The analyzing section 24 generates the light source control signal D4 for controlling the light source and the cooling control signal D5 (the signal D1 in the above embodiment) for controlling the cooling fluid cooling section 6 from the video signal by histogram analysis, and outputs them. Here, the analyzing section 24 outputs the light source control signal D4 relatively late, and outputs the cooling control signal D5 relatively early. And, the light source control signal D4 is input to the light sources 512, 513, and 514, and the cooling control signal D5 is input to the cooling fluid cooling section 6 via the temperature control section 30 (FIG. 9, step S3b).

In such a data delay section 20, the video signal D2 is temporarily stored in the memory 22, and then output with time delay corresponding to the time difference between the output of the light source control signal D4 and the output of the cooling control signal D5. Therefore, the timing when the video signal D2 is input to the liquid crystal light valves 522, 523, and 524 becomes concurrent with the timing when the light source control signal D4 is input to the light sources 512, 513, and 514.

It should be noted that in the case in which the parameter obtained for generating the light source control signal D4 is output as a control level such as the duty ratio of the light source or the voltage level of the light source in the analyzing section 24, the light source control signal D4 can be used directly as the cooling control signal D5, and further the light control process can be performed using the light source control signal D4. Meanwhile, in the case in which the parameter obtained for generating the light source control signal D4 is output as a signal level of an image such as the AP1, or the peak of an image, or a gray scale value (brightness value) obtained from the histogram analysis in the analyzing section 24, the light control process and the image processing such as an expansion process associated with the light control process can be performed using the light source control signal D4.

Figure 7:
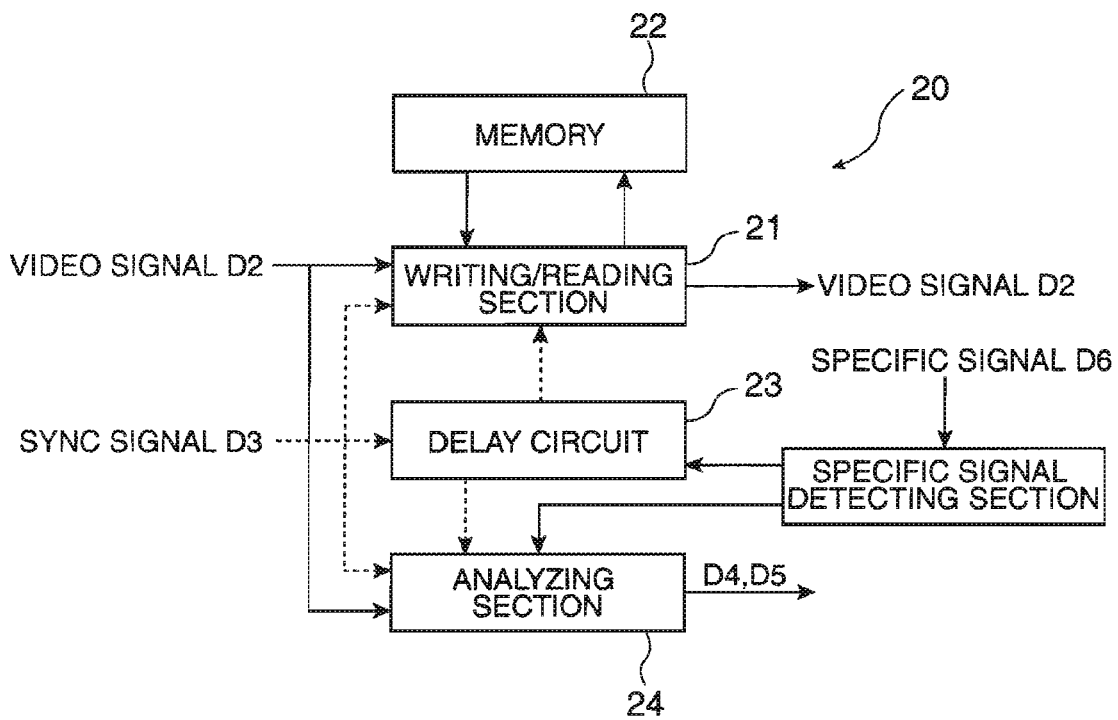
FIG. 7 is another block diagram showing a specific functional configuration of a data delay section.
Figure 8:
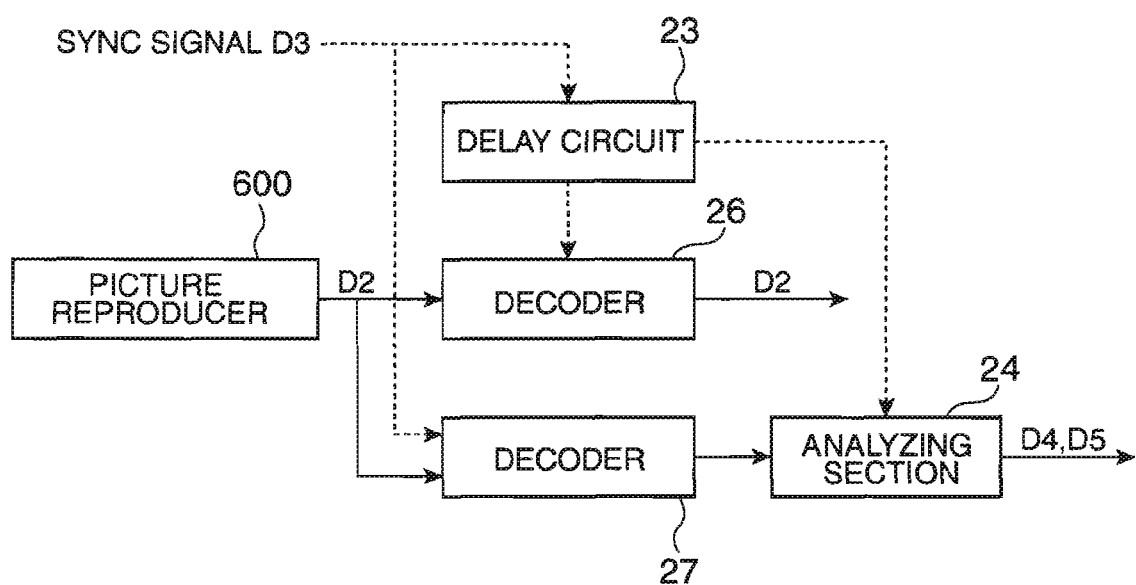
FIG. 8 is another block diagram showing a specific functional configuration of a data delay section.

Further, in the case in which the predetermined signal D supplied from the outside includes a specific signal D6 such as an emergency signal besides the video signal D2 and the sync signal D3, it is possible to adopt a configuration in which a specific signal detecting section 25 for detecting the specific signal D6 is provided, as shown in FIG. 7, and the video signal D2 and the light source control signal D4 are output in real time without any delay if the specific signal D6 is detected.

In the case of adopting such a configuration, it becomes possible to display an emergency broadcast image or the like in real time without any delay. It should be noted that even in such a case, it is preferable to control the light sources 512, 513, and 514 not to be heated to the damaging temperature. Specifically, if it seems that the temperatures of the light sources 512, 513, and 514 are heated to the damaging temperature or higher, it is possible to reduce the light intensities of the light sources 512, 513, and 514 to display a darker image.

Further, projectors are usually provided with decoders for decoding an output from a picture reproducer such as a DVD player device. Therefore, if the predetermined signal D supplied thereto is a signal from the picture reproducer 600, as shown in FIG. 8, it becomes unnecessary to separately provide the writing/reading section 21 or the memory 22 by adopting a configuration in which the decoders 26 and 27 are included in the configuration elements of the data delay section 20, the decoder 26 for supplying the liquid crystal light valve with the video signal D2 is supplied with the sync signal delayed by the delay circuit 23, and the decoder 27 for supplying the analyzing section 24 with the video signal D2 is supplied with the sync signal in real time.

Although the preferred embodiments of the cooling device, the projector, and the cooling method according to the invention are explained above with reference to the accompanying drawings, it is needless to say that the invention is not limited to the above embodiments. The various shapes and combinations of the configuration elements presented in the embodiments described above are provided for exemplification only, and can be modified in various ways within the spirit or the scope of the invention in accordance with design needs and so on.

For example, in the above embodiments the explanations are made citing the light source for the projector as a specific example of the heat generator H. However, the cooling device according to the invention is not limited to those for cooling the light source of the projector, but can be applied to those for cooling the heat generator providing the heat value to be generated in the future by the heat generator can be calculated based oil the predetermined signal supplied to the heat generator.

Further, in the embodiments described above the explanations are made assuming that the cooling fluid cooling section 6 is composed of the fan-drive motor 61 and the fan 62. However, the invention is not limited to this configuration, but a peltier element can also be used as the cooling fluid cooling section 6.

Further, in the above embodiments, the signal processing sections 10 in the cooling devices S respectively provided to the light sources 512, 513, and 514 can be combined into one section.

Further, in the embodiment described above, the explanations are made citing the LED light source as an example of the solid-state light source. However, the invention is not limited to such an example, but the electroluminescence (EL) or the semiconductor laser can also be used as the solid-state light source.

Further, although the liquid crystal light valve is adopted as the light modulation device in the embodiment described above, micro mirror array devices and so on can also be adopted as the light modulation device.

Still further, although in the above embodiments the image is displayed by projecting the image light on the projection screen using the projection lens, the projection mirror can also be used instead of the projection lens.

What is claimed is:

1. A cooling device that cools a heat generator via a cooling fluid, the cooling device operating based on a cooling signal, the cooling signal having a relationship to a predetermined signal, the cooling device comprising:
a cooling fluid cooling section that cools the cooling fluid;
a control section that controls the cooling fluid cooling section in accordance with the cooling signal;
a signal processing section that supplies the heat generator with a heat generator operation signal, based on the predetermined signal, after supplying the cooling signal to the control section; and
a data delay section included in the signal processing section, the data delay section comprising:
a delay circuit,
a writing/reading section configured to store and retrieve a video signal based on a sync signal from the delay circuit, the sync signal being first input to the delay circuit and the video signal being first input to the writing/reading section corresponding to the predetermined signal, and
an analyzing section configured to generate a light source control signal and the cooling signal based on the video signal, the light source control signal output from the analyzing section and the video signal output from the writing/reading section being the heat generator operation signal.

2. The cooling device according to claim 1, further comprising:
a plurality of heat generators, cooling fluids, cooling fluid cooling sections, and control sections, one cooling fluid, cooling fluid cooling section and control section being provided for each heat generator.

3. The cooling device according to claim 1, further comprising:
a specific signal detecting section that detects a specific signal that is different from the signal based on the predetermined signal,
the signal processing section outputting the predetermined signal in real time if the specific signal detecting section detects the specific signal.

4. The cooling device according to claim 1, the cooling fluid being in liquid form.

5. The cooling device according to claim 1, the cooling fluid cooling section including a cooling fan.

6. A projector, comprising:
a cooling device that cools a heat generator via a cooling fluid, the cooling device operating based on a cooling signal, the cooling signal having a relationship to a predetermined signal, the cooling device comprising:
- a cooling fluid cooling section that cools the cooling fluid:
- a control section that controls the cooling fluid cooling section in accordance with the cooling signal;
- a signal processing section that supplies the heat generator with a heat generator operation signal, based on the predetermined signal, after supplying the cooling signal to the control section; and
- a data delay section included in the signal processing section, the data delay section comprising:
  - a delay circuit,
    - a writing/reading section configured to store and retrieve a video signal based on a sync signal from the delay circuit, the sync signal being first input to the delay circuit and the video signal being first input to the writing/reading section corresponding to the predetermined signal, and
    - an analyzing section configured to generate a light source control signal and the cooling signal based on the video signal, the light source control signal output from the analyzing section and the video signal output from the writing/reading section being the heat generator operation signal, wherein the heat generator is a light source.

7. The projector according to claim 6, a light control process for displaying an image is executed with the heat generator operation signal.

8. A method of cooling a heat generator via a cooling fluid, based on a cooling signal that has a relationship to a predetermined signal, the method comprising:
- cooling the cooling fluid with a cooling fluid cooling section;
- supplying the cooling signal to a control section that controls operation of the cooling fluid cooling section; and
- subsequently supplying a heat generator operation signal from a signal processing section including a data delay section, that is based on the predetermined signal, to the heat generator, the method of supplying the heat generator operation signal comprising:
  - storing and retrieving a video signal in a writing/reading section based on a sync signal, the sync signal and the video signal corresponding to the predetermined signal, the sync signal being first input to the delay circuit and the video signal being first input to the writing/reading section corresponding to the predetermined signal,
  - generating a light source control signal and the cooling signal from the video signal in an analyzing section, the light source control signal output from the analyzing section and the video signal output from the writing/reading section being the heat generator operation signal.

9. A cooling device that cools a heat generator via a cooling fluid, comprising:
- a cooling section that cools the cooling fluid;
- a control section that controls operation of the cooling section based upon receipt of a cooling signal;
- a signal processing section that includes a data delay section and a temperature control section, the data delay section supplying, after a predetermined delay, a predetermined signal to control operation of the heat generator, and supplying, without the predetermined delay, the predetermined signal to the temperature control section, the temperature control section supplying the cooling signal to the control section based on the predetermined signal,
- the data delay section comprising:
  - a delay circuit,
    - a writing/reading section configured to store and retrieve a video signal based on a sync signal from the delay circuit, the sync signal being first input to the delay circuit and the video signal being first input to the writing/reading section corresponding to the predetermined signal, and
    - an analyzing section configured to generate a light source control signal and the cooling signal based on the video signal, the light source control signal output from the analyzing section and the video signal output from the writing/reading section being the heat generator operation signal.

10. The cooling device according to claim 9, the temperature control section generating the cooling signal based on a predicted heat value of the heat generator.

11. The cooling device according to claim 10, further comprising a temperature sensor that senses a temperature of the heat generator, the predicted heat value of the heat generator being based on the predetermined signal supplied to the heat generator after the predetermined delay and the temperature of the heat generator sensed by the temperature sensor.

12. The cooling device according to claim 1, the signal processing section supplying the heat generator with the heat generator operation signal, based on the predetermined signal, after a predetermined period of time from supplying the cooling signal to the control section.

13. The cooling device according to claim 1, wherein the data delay section supplying, after a predetermined period of time from supplying the cooling signal to the control section, the heat generator operation signal to the heat generator.

14. The cooling device according to claim 1, the heat generator being a light source.

15. The method according to claim 8, the supplying the heat generator with the heat generator operation signal, based on the predetermined signal, being after a predetermined period of time from supplying the cooling signal to the control section.

16. The method according to claim 8, the heat generator being a light source.

17. The cooling device according to claim 9, the heat generator being a light source.

* * * * *